UNITED STATES PATENT OFFICE.

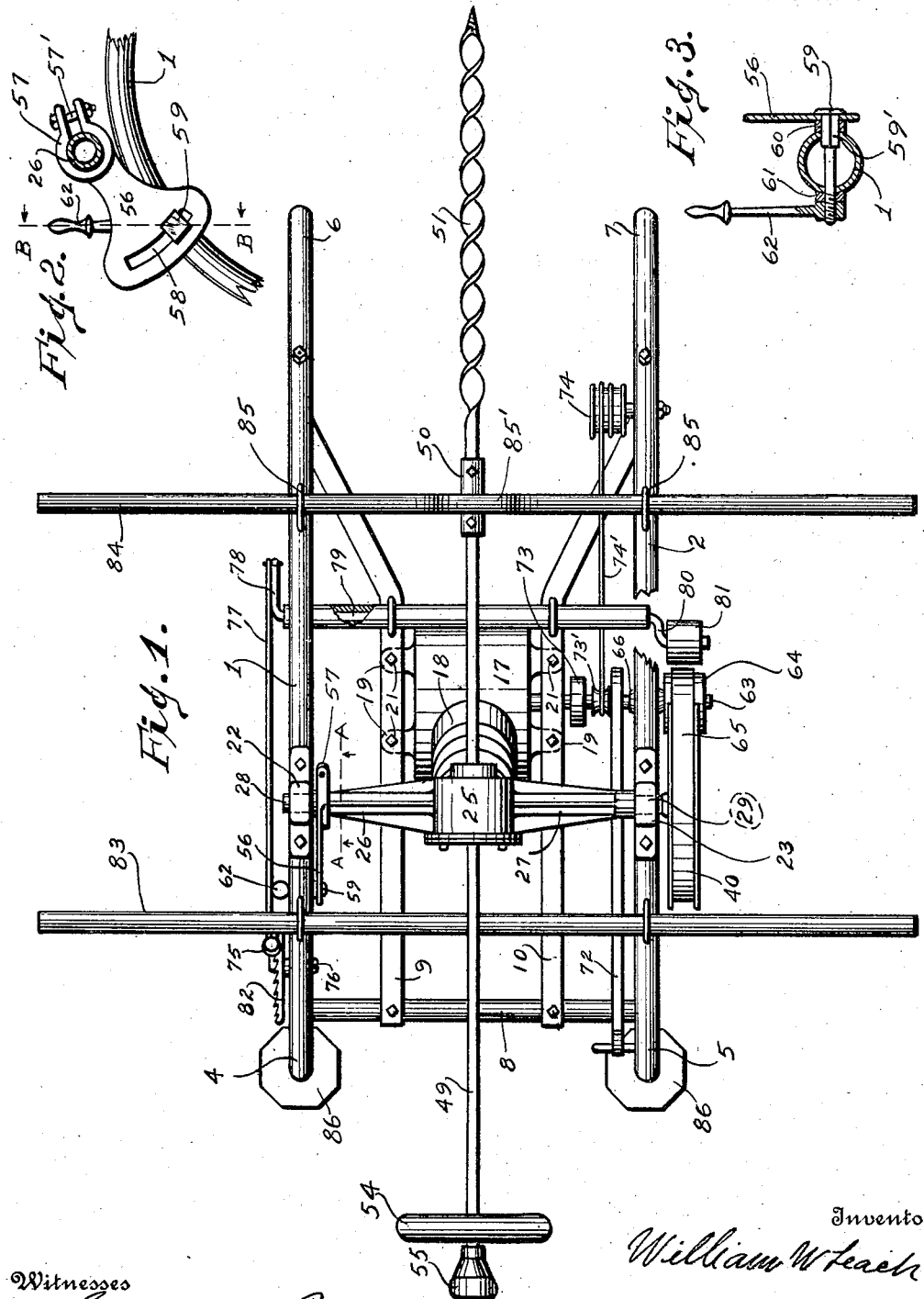

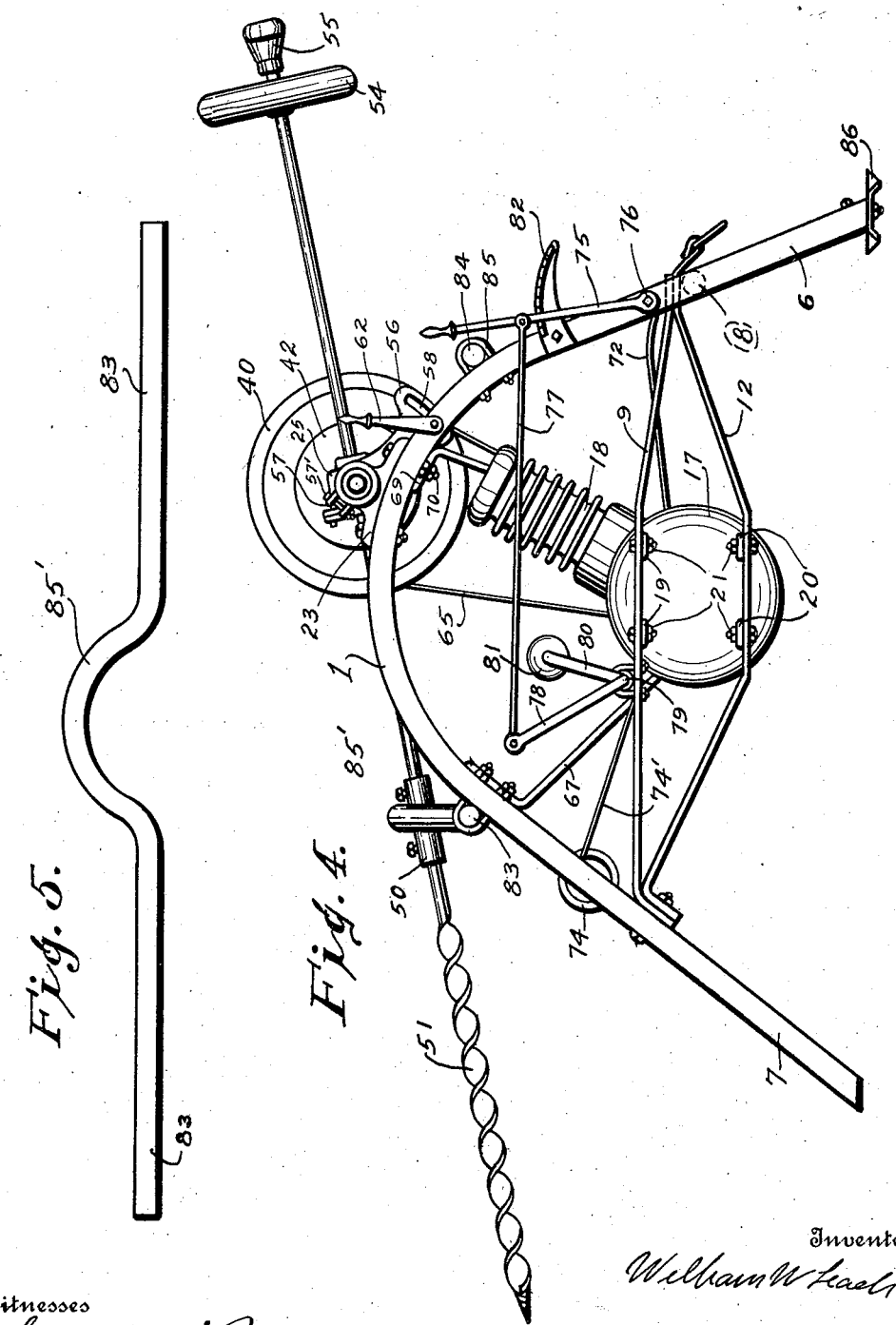

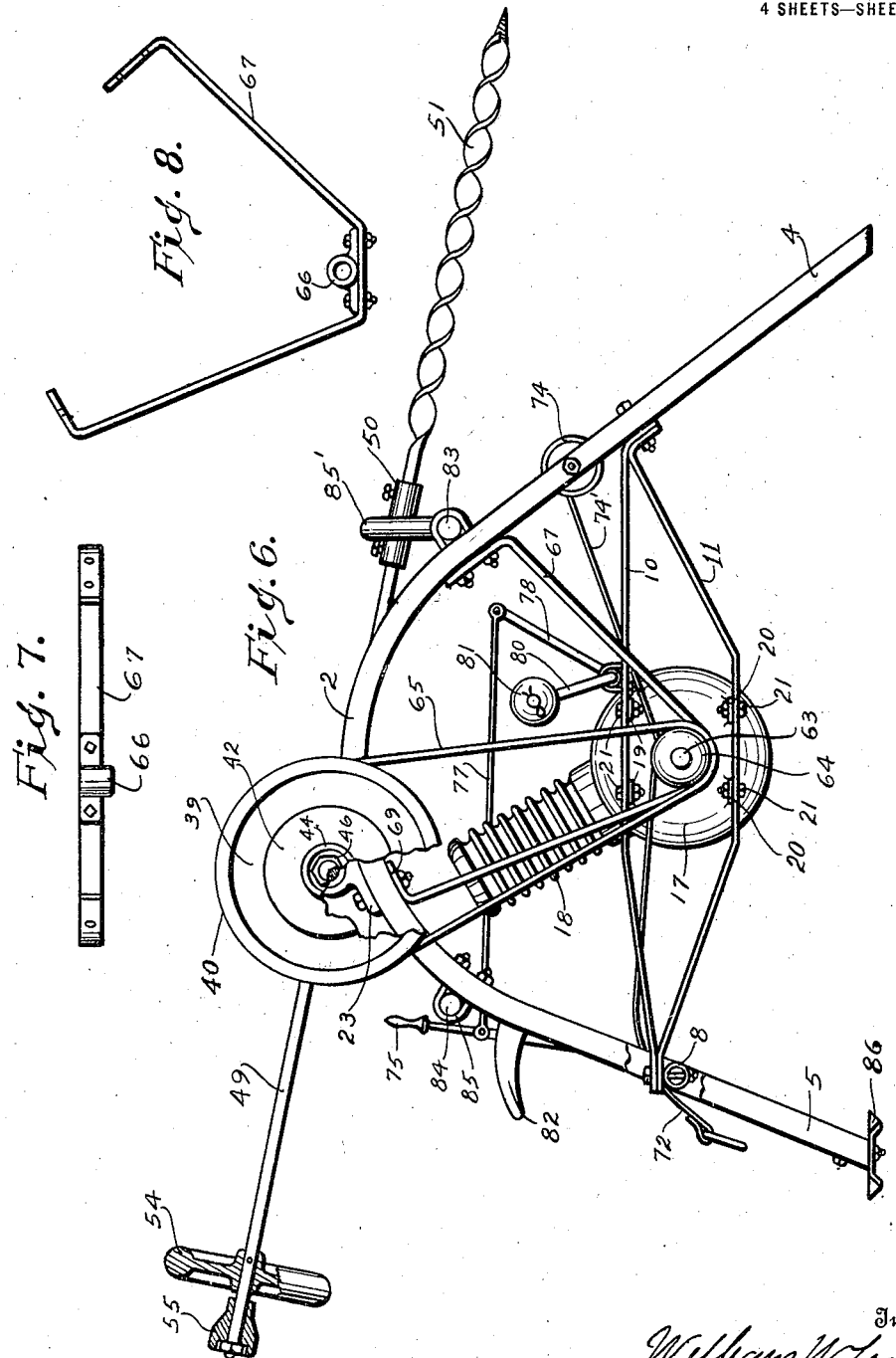

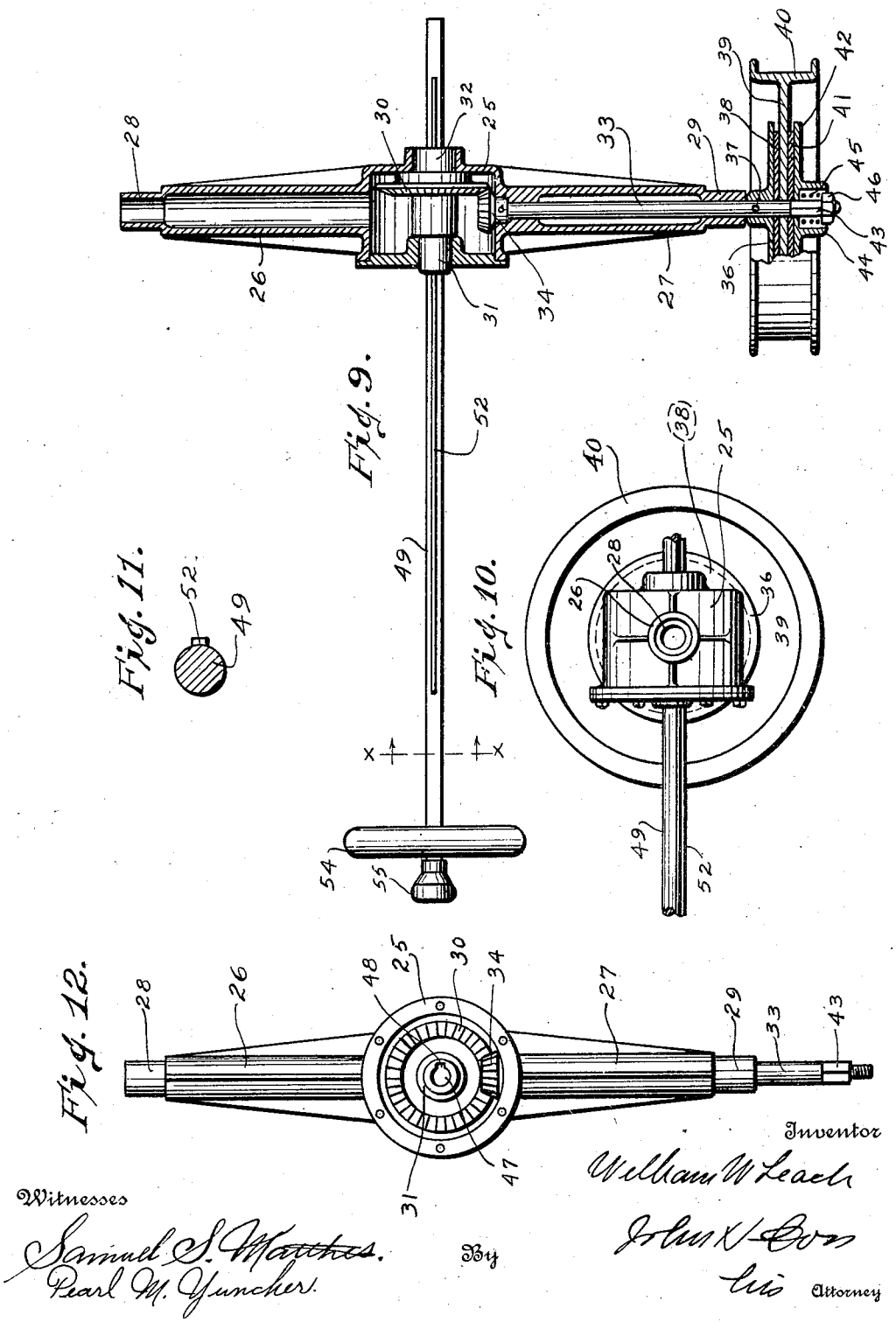

WILLIAM W. LEACH, OF PINELAND, TEXAS.

PORTABLE POWER STUMP-BORING MACHINE.

1,242,566.     Specification of Letters Patent.     Patented Oct. 9, 1917.

Application filed September 18, 1914. Serial No. 862,278.

*To all whom it may concern:*

Be it known that I, WILLIAM W. LEACH, a citizen of the United States of America, residing at Pineland, in the county of Sabine and State of Texas, have invented certain new and useful Improvements in Portable Power Stump-Boring Machines, of which the following is a specification.

This invention relates to certain new and useful improvements in portable power stump boring machines.

In the boring of holes in stumps for the reception of powder or dynamite to blow up the stump, in many cases the stump is rotted or diseased in places and when the auger reaches the rotted place, which is soft, it is suddenly thrown forward and becomes wedged between the undiseased or hard portions of the stump that exist on each side of the diseased or rotted part and when so wedged the auger or its propelling shaft is likely to be broken.

The invention therefore has for its primary object, automatic stoppage of the auger, should the same bind or become wedged in the stump.

Further objects of the invention are to enable the auger to be tilted at varying angles to the surface of the ground so as to enable holes to be bored in the stump at any desired angle; to provide means to lock the auger at the desired angle which the hole is to have; to provide for manual control of the feed of the auger to thereby enable same to be fed forward or withdrawn, and to provide novel means whereby the motor may be permitted to operate without operation of the auger.

Further the invention aims to provide means whereby the auger movements may be manually controlled so as to prevent breakage of same, or of any of the parts which drive the auger.

Still further the invention aims to provide means whereby the entire machine may be easily and conveniently transported by two men.

In the drawings:

Figure 1 is a top plan view of the invention;

Fig. 2 is a section on the line A—A of Fig. 1;

Fig. 3 is a sectional view on the line B—B of Fig. 2;

Fig. 4 is an elevation of one side of the machine;

Fig. 5 is a detail view of one of the carrying bars;

Fig. 6 is a side elevation of the opposite side of the machine;

Fig. 7 is a top view of the hanger used to support the crank shaft;

Fig. 8 is a side elevation of Fig. 7;

Fig. 9 is a sectional view showing the friction clutch and means for actuating the stem of the auger;

Fig. 10 is a detail side elevation of the auger head;

Fig. 11 is a section on the line X—X of Fig. 9; and

Fig. 12 is a side elevation of the auger head.

In accordance with the present invention, a frame is employed which includes a pair of spaced longitudinal inverted U-bars 1 and 2 the lower or free ends of which provide legs 4, 5, 6 and 7, the bars being connected by a transverse bar 8. Upper longitudinal braces 9 and 10 and lower longitudinal braces 11 and 12 are bolted at their rear ends to the bar 8 and have their front ends diverging and bolted to the longitudinal bars 1 and 2. The upper and lower longitudinal braces just mentioned have their major portions arranged in spaced relation.

The propelling means for the auger consists of a motor 18, the casing 17 of which is provided with lugs 19 and 20 which are secured to the braces by means of bolts 21, the motor having an angular relation to the frame as depicted in Fig. 6.

The auger supporting means which enables the auger to be moved to varying angular positions so as to bore holes in the stumps at varying angles to the surface of the ground, includes a head 25 having trunnions 26 and 27 which latter are provided with journals 28 and 29 rotatably received within journal boxes 22 and 23 secured to the frame bars 1 and 2 adjacent the top portions of the latter.

Mounted within the head 25 is a bevel gear 30 which has journals 31 and 32 revolubly borne by the head, the gear meshing with a bevel pinion 34 secured on a shaft 33, the shaft 33 being journaled in the trunnion arm 27. A disk 36 is rigidly secured by a screw 37 to the shaft 33 and engages one face of a fiber washer 38 that is placed on the shaft 33. A sheave pulley 40 having a web 39 is mounted on shaft 33 and its said web on one face engages the opposite face of the fiber washer 38 and the opposite face of the pulley web 39 engages a similar fiber washer 41 which is also mounted on the shaft 33. The washer 41 is engaged by a disk 42 which has a square aperture that receives the squared end 43 of the shaft 33 and also has a hub 44 which is bored to receive a coil spring 45 which latter abuts the disk 42 and a nut 46 threaded onto the shaft 33, the spring acting to exert tension on the disk 42 to force the latter and the washers 41 and 38 and the pulley web 39 into frictional engagement with each other.

It will be apparent from the foregoing that the disks 36 and 42 and the washers 38 and 41 act to provide a friction clutch for the pulley 40, the frictional engagement of the parts being controlled by the tension of the spring 45, which latter may be regulated by turning of nut 46 to cause greater or less frictional contact between the parts, as desired. Obviously, if the strain on the shaft 33 exceeds or overcomes the extent of frictional engagement between the parts of the clutch, then slippage will occur in the latter and the shaft 33 will consequently remain stationary, preventing undue forcible rotation of the auger, such as might break or damage the latter.

The gear 30 is provided with a central aperture 47 (Fig. 12) and a key-way 48 which communicates therewith for the purpose of slidably receiving the stem 49 that carries the chuck 50 of the auger 51, the stem having a feather key 52 which slides in the key-way 48. Rotation of the pulley 40 drives shaft 33 by virtue of the friction clutch and since gear 30 meshes with pinion 34 on shaft 33, it will be seen that the auger stem 49 will be driven by reason of its connection with gear 30. For the purpose of sliding the auger or feeding same to the work, a hand operating wheel 54 is rigidly secured to the auger stem 49. By manipulation of the wheel 54, the operator may move the stem and therewith the auger back and forth and in addition the wheel 54 serves as a means whereby the operator may manually turn or rotate the auger. A knob 55 is loosely journaled on the outer end of stem 49 and is used for the purpose of exerting pressure on the stem 49 to move the latter back and forth when the stem is being power operated.

For the purpose of holding the auger rigidly in any of its adjustments to obtain varying angular disposition thereof, a sector 56 is provided, Fig. 2, the sector having a clamp 57 fitted on the trunnion arm 26 and held rigid thereon by a bolt 57'. The sector further has an arc-shaped slot 58 through which a bolt 59 passes. The bolt receives a washer 60 thereon (Fig. 3) and has a squared portion 59' which is received in a square aperture provided therefor in the frame bar 1. The threaded end of bolt 59 receives a washer 61 thereon which abuts the opposite side of frame bar 1 and also a clamping lever 62 which can be manually operated to tighten the bolt and thereby hold the sector rigid in any position which the sector is capable of being moved to.

The crank shaft 63 of the motor has a sheave pulley 64 thereon over which and the pulley 40, a belt 65 engages, to transmit movement from the pulley 64 of the motor to the pulley 40.

For the purpose of relieving the crank shaft of excessive strain and to obviate undue vibration, a bearing 66 is fitted to the crank shaft 63 and is supported by the hanger 67, the ends of which are fastened to the frame bar 2.

The motor is started by a mechanism which forms the subject matter of co-pending application, Serial No. 862,279, filed September 18, 1914, and in brief includes a strap 72 wound on a drum connected to the crank-shaft of the motor and a drum 73' also rigid on the motor shaft, which drum 73' is connected by a cable 74' to a spring wound drum 74, a clutch 73 being mounted on the motor shaft one part of which clutch is connected to the drum 73' and the other part of which is connected to the motor shaft, so that when strap 72 is pulled the clutch will rotate the motor shaft and at the same time, through cable 74' wind spring drum 74, whereby upon release of strap 72 the drum 74 will again rewind the strap on its drum to again reset the parts ready for a second operation.

When the motor is in operation, belt 65 rotates loosely around pulley 64 and pulley 40, and when it is desired to drive the pulley 40, the belt 65 is tightened by pulling upon a lever 75 which is pivoted at 76 to the frame bar 1 and is connected by a link 77 to a crank 78 formed on a rock shaft 79, the latter having a crank 80 on which an idler pulley 81 is mounted and is adapted to bear so as to tighten the belt to any desired extent. A rack bar 82 is fastened to the frame and is adapted to hold the lever 75 in any of its adjusted positions.

For the purpose of enabling the machine to be easily and conveniently transported, a pair of parallel carrying bars 83 and 84 are secured to the frame by the clips 71 and other clips 85 respectively. The carrying bar 84 is provided with a loop 85' so as to allow the auger to have desired vertical up movement.

In operation the motor is started and the head adjusted and set to the proper angle. The operator now pulls on lever 75 forcing idler 81 into engagement with the belt 65 thereby driving the auger through means of the gear 30, pinion 34, shaft 33 and pulley 40. The hole is now bored in the stump and upon completion of the boring operation the auger is withdrawn.

Should however, the auger by reason of striking a rotted portion in the stump be wedged therein, then the friction clutch will rotate without rotation of the auger, whereupon the operator throws lever 75 so as to move idler pulley 81 out of engagement with the belt and then withdraws the auger partially from the hole being drilled by means of the hand wheel 54. The operator now again moves pulley 81 to tighten the belt and to drive the auger and gradually refeeds the auger into the hole by means of wheel 54, until the auger is normally rotating whereupon wheel 54 is released and the feed of the auger is continued by grasping knob 55.

The belt idler mechanism allows the motor shaft to be rotated by the means before mentioned, for starting purposes without operating the auger.

Roughened feet 86 may be secured to the legs 5, if desired, so as to bite into the ground and thus anchor the frame.

What is claimed is:

1. In combination with a frame including side bars, a head having trunnions journaled on the side bars of the frame, an auger borne by the head and movable therewith to be angularly adjusted in a vertical plane, a removable sector angularly adjustably clamped on one of the trunnions and positioned to lie next the inner side of the adjacent side bar, said sector being formed with a slot, the specified side bar being provided with an aperture of angular section, a headed bolt passing through the sector slot and slidably engaged in the aperture of the side bar, the opposite end of the bolt being threaded and projecting from the outer side of the bar, and a clamping lever engaged with the threaded end of the bolt to slide the latter for holding the sector rigid.

2. In a stump boring machine, in combination with a frame, a hollow cylindrical head having a removable disk closing one end, radial, oppositely extending, relatively long, tubular projections having terminal trunnions journaled on the frame, an auger, a gear housed by the head, and journaled in its disk ends, a stem slidable through the gear and carrying the auger on one end, and a drive for the gear including a shaft extending through one of the trunnions, and into the head and journaled at both ends.

In testimony whereof I affix my signature in presence of two witnesses.

WILLIAM W. LEACH.

Witnesses:
D. R. BAXTER,
S. P. McELROY.

Copies of this patent may be obtained for five cents each, by addressing the "Commissioner of Patents, Washington, D. C."